Patented Nov. 5, 1935

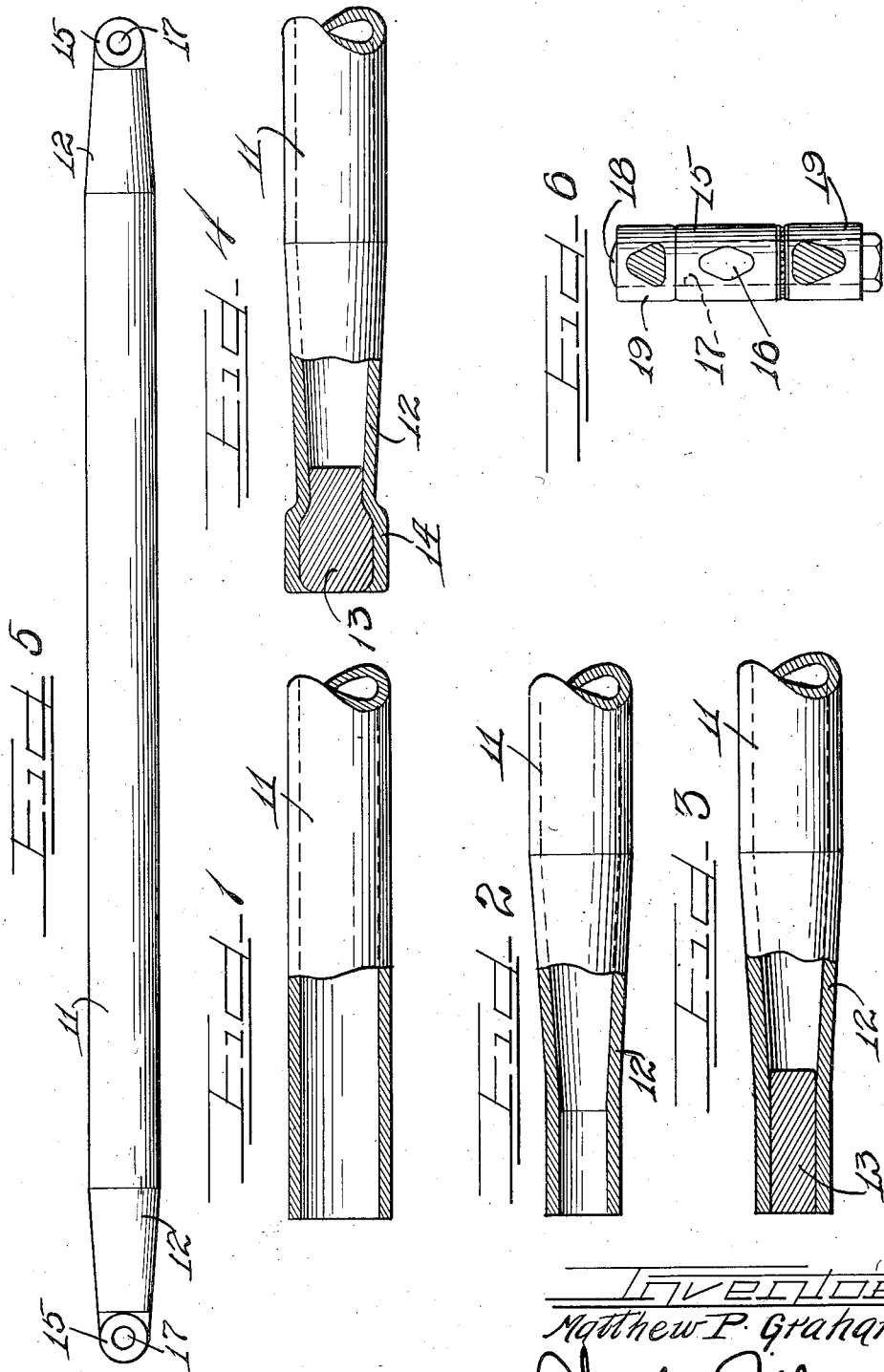

2,019,811

UNITED STATES PATENT OFFICE 2,019,811

TUBULAR AXLE

Matthew P. Graham, Detroit, Mich., assignor to Thompson Products Incorporated, Detroit, Mich., a corporation of Ohio Original application July 15, 1932, Serial No. 622,656. Divided and this application April 26, 1934, Serial No. 722,464

3 Claims. (Cl. 301—124)

This invention relates to tubular metal articles having solid ends thereon.

More specifically, this invention relates to tubular axles for automotive vehicles.

This application is a division of my copending application entitled "Method of forming solid ends on metal tubing", Serial No. 622,656, filed July 15, 1922, now Patent No. 1,964,258, dated June 26, 1934.

The principal purpose of this invention is to provide a simple and economical tubular metal article with solid ends thereon. The article of this invention is suitable for use as an axle in automotive vehicles and is properly formed by a process involving the steps of cutting a metal tube to the desired length, swaging a free end of the tube to reduce the diameter of this portion, forcing a comparatively short solid metal plug into the reduced portion and subsequently upsetting the end.

It is therefore an object of this invention to provide a simple and economical tubular metal article with solid reinforced ends.

A further object of this invention is to provide tubular axles having reinforced ends upset to form reinforced king pin receiving portions.

A particular object of this invention is to provide a tubular vehicle axle wherein the ends of a tube are reduced in cross section and have metal plugs inserted therein.

These and other objects of this invention will be apparent to those skilled in the art from the following detail description of the drawing which form a part of this specification. The invention is most readily described by referring to the process used in making the tubular metal articles of the invention.

On the drawing:

Figure 1 is a fragmentary elevational view, partly in section, of a metal tube from which the metal article of this invention may be formed.

Figure 2 is a view similar to Figure 1 of a tube having an end thereof swaged, reamed, and faced.

Figure 3 illustrates the tube of Figure 2 with a plug inserted therein.

Figure 4 illustrates a subsequent operation of upsetting the end of the tube.

Figure 5 is a plan view of a tubular front axle according to this invention, and Figure 6 is an end elevational view of the axle shown in Figure 5 with a king pin inserted therein holding the yoke arms of a front wheel stub axle.

As shown on the drawing:

In Figures 1 to 4 inclusive the reference numeral 11 indicates a light, seamless metal tube which is cut to the desired length from longer tubular stock. The metal tube 11, as indicated at 12 in Figure 2, has its ends swaged to reduce the diameter of the tube at these portions.

Figures 1 to 4 inclusive, of the drawing, illustrate process steps in forming one end only of the complete tubular axle shown in Figure 5. It should be understood that like steps are performed on the opposite end of the tube.

The swaging of the tube may be performed after the tube has been heated to forging temperatures or this step may be carried out while the tube is cold. In carrying out the swaging process, the ends of the walls of the tube may be thickened or drawn out and maintained at the same thickness as the rest of the tube.

The swaged portion 12 of the tube has its inner face reamed and subsequently a metal plug 13 is pressed in the swaged and reamed end. The end of the rod is then heated to forging temperature and upset as shown at 14 in Figure 4.

The upsetting operation serves to firmly secure the inner metal 13 to the tube metal 11. In this operation, a set of dies is used so as to form the upset portion 14 into the cylinder 15 as best shown in Figure 6. The jaws of the die grip the tube metal and prevent the flow of the metal of the plug. The metal of the tube does not fully cover the inner metal and a small portion of it projects as shown at 16 in Figure 6, but this portion is finished off even with the outer metal and does not in any way interfere with the subsequent use of the finished tube.

When the finished article is to be used for an axle, such as the front axle of an automotive vehicle, the cylindrical portion 15 has a cylindrical aperture 17 bored therethrough. This aperture receives the king pin 18 of the automobile front wheel. No bushing or sleeve is necessary in the aperture 17 but may be used if desired.

While any suitable tube steel may be used for the tube and any suitable steel may be used for the plug, it has been found preferable, in practice, to use a tube steel having 0.35% carbon or higher while the plug steel preferably has a low carbon content of 0.20% carbon or less. It has been found that the low carbon plug is more fluid at forging temperatures than the high carbon tube and consequently readily adapts itself to the shape of the end of the tube formed in the upsetting process.

As an alternative method of making the tube, the plug may be pressed into the end of the tube and the end of the tube heated to forging temperature and subsequently swaged to reduce the size of the tube and the plug and then the upsetting operation is performed as indicated before. When the article is formed by this latter method, it has been found advantageous to place the plug a short distance within the tube and then to peen over the edges of the tube so as to firmly secure the plug previous to the swaging and upsetting operations.

It will be also understood that the article can be formed by placing the plug in the tube and subsequently upsetting as before, but without the intermediate step of swaging.

The metal article of this invention with solid forged ends as described finds ready application in the automotive industry, particularly for use as front axles of automotive vehicles. The tubular structure gives them the necessary rigidity and lightness for such a part. The particular construction of the end portions 15 serves as suitable supporting members for attaching the yoke arms of the front wheel stud axle indicated in Figure 6 by reference numeral 19.

I am aware that numerous changes may be made and the details of construction may be varied throughout a wide range without departing from the spirit of this invention, and I do not wish to be limited otherwise than is necessary by the prior art and the scope of the appended claims.

I claim as my invention:

1. A light weight tubular axle comprising a shell of high carbon steel, said shell being tubular at the middle portion, a core of low carbon steel disposed entirely within the shell longitudinally thereof adjacent each end and integrally united therewith, said axle having king pin openings adjacent its ends extending through both the shell and the low carbon steel cores at an angle to the axis of the axle for receiving king-pin members in bearing contact with both the cores and shell.

2. A metal article comprising a tubular shell, a core of solid metal disposed entirely within the shell longitudinally thereof adjacent each end thereof and integrally united thereto, the ends of said article having aligned equal sized openings extending through both the shell and the core at an angle to the axis of the shell for receiving king-pin members in contacting engagement therewith.

3. An axle comprising a tube of high carbon steel having tapered portions near the ends thereof and enlarged upset end portions, plugs of low carbon steel inserted longitudinally within the end portions in snug engagement with the inside walls thereof and extending into the tapered portions away from the ends with gradually increasing diameter whereby said plugs are locked against longitudinal movement relative to the tube, said plugs furthermore being integrally united to the tube, and openings extending through both the tube and plugs at an angle to the axis of the tube for receiving king-pin members in engagement with both the tube and plugs.

MATTHEW P. GRAHAM.